W. O. JEFFRIES.
TIRE.
APPLICATION FILED JAN. 18, 1918.
1,269,938.
Patented June 18, 1918.
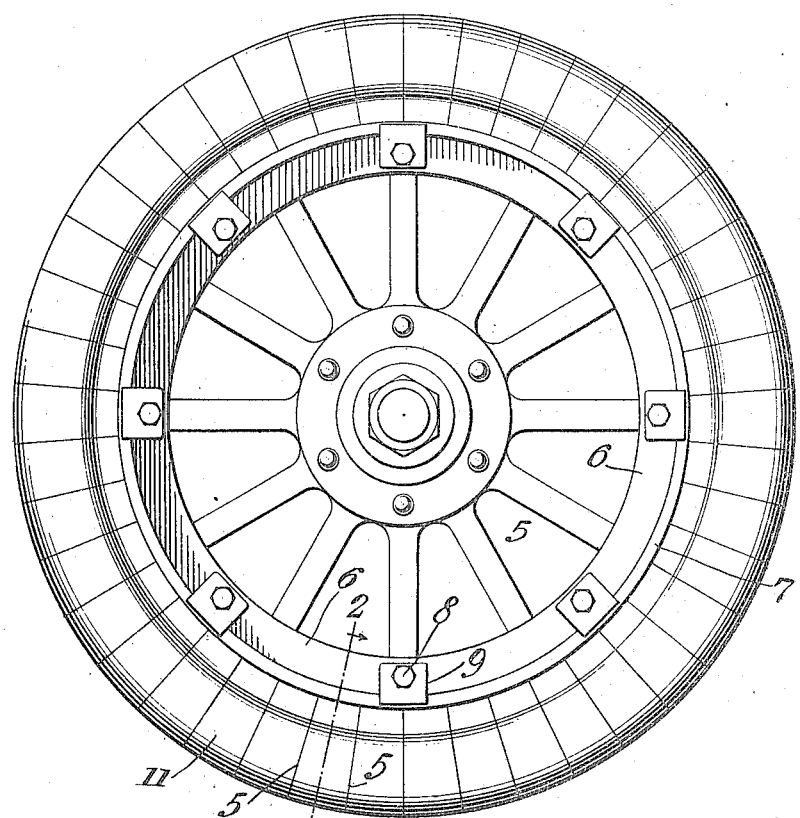
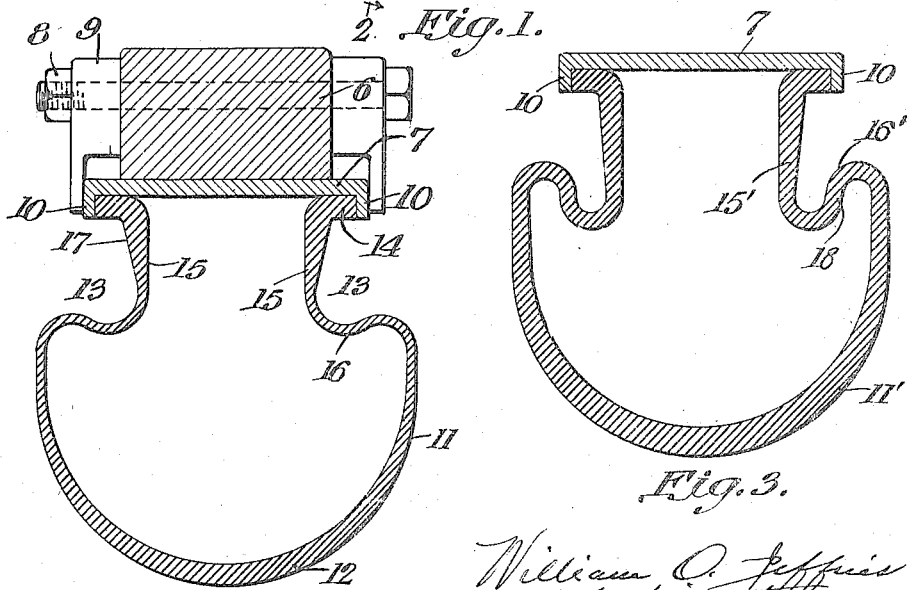

UNITED STATES PATENT OFFICE.

WILLIAM O. JEFFRIES, OF BOSTON, MASSACHUSETTS, ASSIGNOR OF ONE-HALF TO ARTHUR F. VIANO, OF SOMERVILLE, MASSACHUSETTS.

TIRE.

1,269,938.     Specification of Letters Patent.     Patented June 18, 1918.

Application filed January 18, 1918. Serial No. 212,503.

*To all whom it may concern:*

Be it known that I, WILLIAM O. JEFFRIES, a subject of King George V of England, residing at Boston, in the county of Suffolk and State of Massachusetts, have invented new and useful Improvements in Tires, of which the following is a specification.

This invention relates to vehicle wheels, especially to that portion of the wheel known as the "tire," the object of the invention being to provide a tire for vehicle wheels which will be resilient, cheap to manufacture, capable of long service and of great mileage and puncture proof.

Furthermore, the object of the invention is to provide a tire which, while possessing great resiliency, does not have to be blown up in order to secure such resiliency.

The invention consists in the combination and arrangement of parts set forth in the following specification and particularly pointed out in the claims thereof.

Referring to the drawings:

Figure 1 is a side elevation of my improved tire showing the same attached to a usual form of wheel.

Fig. 2 is an enlarged transverse section taken on line 2—2 of Fig. 1.

Fig. 3 is a transverse section of a modified form of my invention.

Like numerals refer to like parts throughout the several views of the drawings.

In the drawings, referring to Figs. 1 and 2, 5' is a vehicle wheel of ordinary construction. 6 is the felly of the wheel. 7 is a cylindrical metallic rim which is fastened to the felly 6 by means of bolts 8 extending through clips 9 and through the felly, as shown in Fig. 2.

The cylindrical rim 7 has a pair of annular flanges 10 thereon. The tire proper consists of a plurality of metallic segments 11 arranged in a series around the rim 7. Each of these segments is somewhat U-shaped in cross section and consists of a semi-circular tread portion 12 and oppositely disposed side portions 13, constituting legs, it being understood that the side portions and semi-circular tread portion are all integral. The opposite edges 5 of each of the segments 11 converge toward the central portion of the wheel, as will be clearly seen in Fig. 1.

Each of the side portions 13 consists of an outwardly extending flange 14 at the base of the side portion, a radially extending portion 15, which extends outwardly from the flange 14 and a curvilinear or laterally extending portion 16 which connects the radially extending portion 15 to the semi-circular portion 12. The laterally extending portion 16 is comparatively thin as compared with the tread portion 12 and has, preferably, a curvilinear formation constituting a reverse curve, this being the preferred form of the laterally extending portion 16, but not necessarily the exact form thereof.

It will be noted that the outer walls 17 of the radially extending portions 15 converge toward each other from the flanges 14 and toward the tread portion 12. This gives the portions 15 strength to resist lateral stress when the car is passing around curves.

The flanges 14 are fastened to the rim 7 by rivets or any other desirable fastening means. It is preferable, however, to weld the flanges 14 of the segments to the rim 7 by any suitable welding process, such, for instance, as by the well known spot welding process, thus making the segments in the completed article integral with the rim.

The flanges 10 on the rim 7 prevent any lateral displacement of the segments relatively to said rim.

In Fig. 3 a modified form of my invention is illustrated in which the rim 7 has flanges 10, as hereinbefore set forth, and the segments 11' are of substantially the same construction as the segments 11 illustrated in Figs. 1 and 2, except that they are connected together by a reversed curved portion 16'. The central portion 18 is practically parallel to the portion 15'.

This construction is particularly adapted to be used in connection with heavy vehicles, such as trucks, while the construction illustrated in Fig. 2 is particularly adapted to be used in connection with pleasure vehicles. The portion 18 of the reverse curve in Fig. 3 extends in such a direction that it receives a lengthwise thrust instead of a substantially lateral thrust as in the reversed curve portion 16 illustrated in Fig. 2, that is, the reversed curve portion in Fig. 3 is less resilient to a given weight than the reversed curve portion illustrated in Fig. 2, the formation of the reverse curve portion in Fig. 3 being intended to sustain large weights with less resilient action than the form of the reverse curve portion 16 in Fig. 2.

The tire and the rim fastened thereto are attached to the felly of a vehicle wheel by means of the clips 9 and bolts 8.

In use, the different segments forming the tire proper are resilient by reason of the yielding nature of the reverse curve portion of said segments. The segments are formed of metal and, therefore, they are puncture proof. Said segments are separated preferably by a slight space and each of said segments, in its turn, acts to provide the maximum traction for the tire and also prevents skidding.

On account of the fact that the segments forming the tire are duplicates of each other, they can be manufactured in quantity and applied to the rim very speedily and with small expense.

When the tire is completed it is capable of enormous mileage compared with tires now in use and is particularly adapted to be used not only for pleasure vehicles but for trucks and for any vehicles which are subjected to hard wear, such, for example, as vehicles in use for war purposes, and this is one of the particular uses for which this invention is adapted to be used, on account of its reliability, great strength and freedom from punctures.

Having thus described my invention, what I claim and desire by Letters Patent to secure is:

1. A vehicle wheel having, in combination, a rim and a plurality of U-shaped metallic segments fastened thereto, each of said segments consisting of a semi-circular tread portion and oppositely disposed side portions, each of said side portions consisting of an outwardly extending flange at the base thereof, a radially extending portion extending outwardly from said flange and a curvilinear portion connecting said radial portion to said semi-circular portion.

2. A vehicle wheel having, in combination, a rim and a plurality of U-shaped metallic segments fastened thereto, each of said segments consisting of a semi-circular tread portion and oppositely disposed side portions, each of said side portions consisting of an outwardly extending flange at the base thereof, a radially extending portion extending outwardly from said flange, and a laterally extending portion connecting said radial portion to said semi-circular portion.

3. A vehicle wheel having, in combination, a rim and a plurality of U-shaped metallic segments fastened thereto, each of said segments consisting of a semi-circular tread portion and oppositely disposed side portions, each of said side portions consisting of an outwardly extending flange at the base thereof, a radially extending portion extending outwardly from said flange and a reversed curvilinear portion connecting said radial portion to said semi-circular portion.

In testimony whereof I have hereunto set my hand in presence of two subscribing witnesses.

WILLIAM O. JEFFRIES.

Witnesses:
 CHARLES S. GOODING,
 SYDNEY E. TAFT.

Copies of this patent may be obtained for five cents each, by addressing the "Commissioner of Patents, Washington, D. C."